(12) United States Patent
Cusato

(10) Patent No.: US 6,951,095 B2
(45) Date of Patent: Oct. 4, 2005

(54) STORABLE RAKE

(76) Inventor: David Cusato, PMB 201, 74923 US Hwy, 111, Indian Wells, CA (US) 92210

( * ) Notice: Subject to any disclaimer, the term of this patent is extended or adjusted under 35 U.S.C. 154(b) by 46 days.

(21) Appl. No.: 10/718,019

(22) Filed: Nov. 20, 2003

(65) Prior Publication Data
US 2004/0134179 A1 Jul. 15, 2004

Related U.S. Application Data

(60) Provisional application No. 60/428,141, filed on Nov. 21, 2002.

(51) Int. Cl.[7] ................................................. A01D 7/00
(52) U.S. Cl. ................................................... 56/400.04
(58) Field of Search ................ 473/286; 56/400–400.2; 294/54.4–56.2; 172/371, 378

(56) References Cited

U.S. PATENT DOCUMENTS

| | | | | |
|---|---|---|---|---|
| 2,821,834 A | * | 2/1958 | Walker | .................... 56/400.19 |
| 3,584,739 A | | 6/1970 | Erichson | |
| 3,614,149 A | * | 10/1971 | Clark | ........................ 294/19.2 |
| 4,236,742 A | | 12/1980 | Florence | |
| 4,854,592 A | * | 8/1989 | Milovic | ...................... 473/286 |
| 5,311,733 A | | 5/1994 | Krenkel | |
| 5,590,924 A | | 1/1997 | Quinn et al. | |
| 6,698,178 B1 | * | 3/2004 | Huffman | .................. 56/400.04 |

OTHER PUBLICATIONS

Par Aide 1996 Product Catalog, New Whipping Pole (2pgs).
Par Aide 2002 Product Catalog, Accuform® Ace Bunker Rake (2pgs).

* cited by examiner

*Primary Examiner*—Robert E Pezzuto
(74) *Attorney, Agent, or Firm*—Dorsey & Whitney LLP

(57) ABSTRACT

An implement for use in smoothing disturbed ground. More specifically, a rake is shown for use at golf course sand traps having disturbed surfaces. The rake has a handle and a rake head is attached to the rake handle. The rake head presents a plurality of tines that extend from the rake head and are used to smooth disturbed ground. A spike is carried by the rake head and is used to position the rake near a sand trap in a generally vertical storage position so as to minimize interference with golf play.

18 Claims, 8 Drawing Sheets

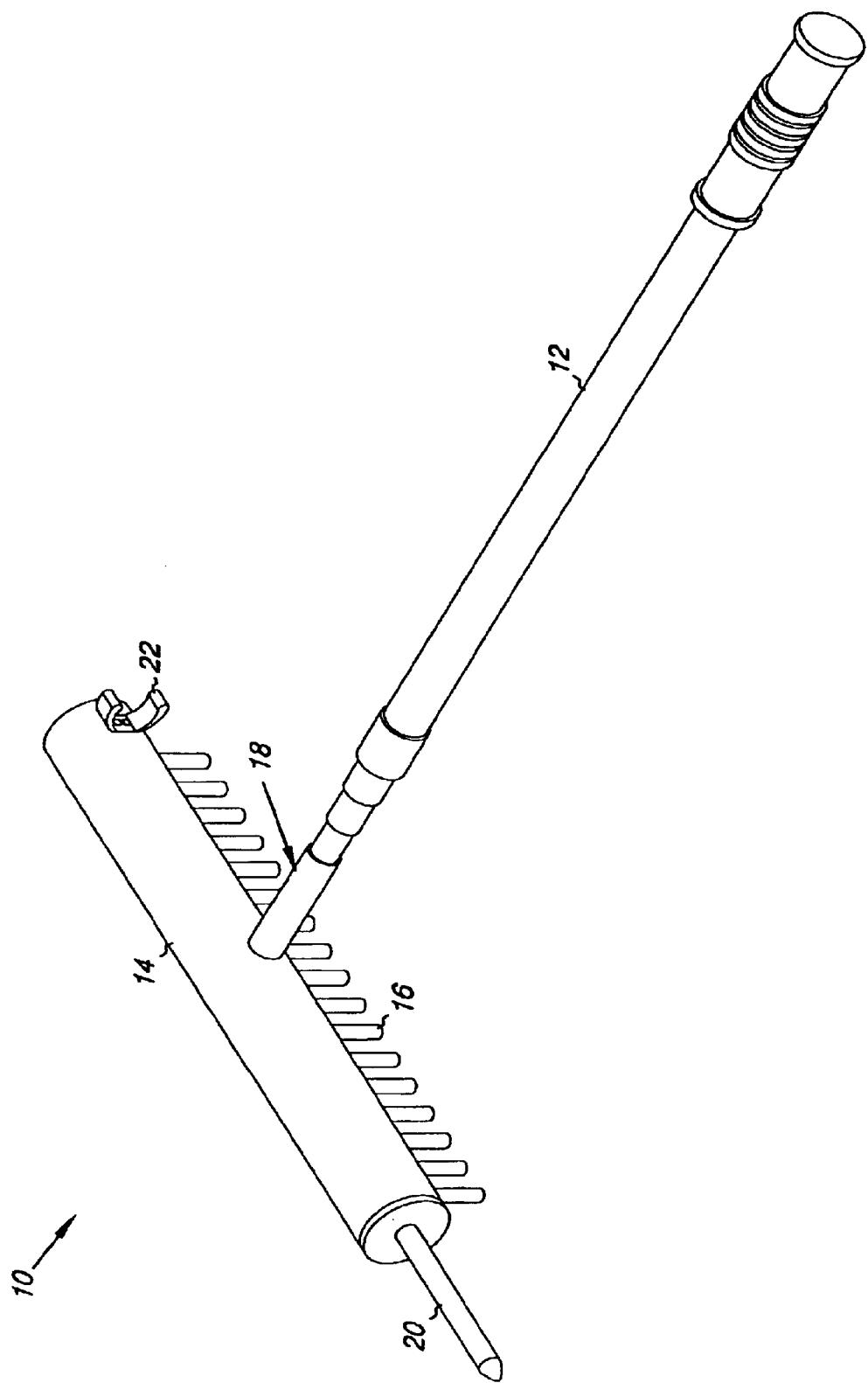

STORABLE RAKE

CROSS-REFERENCE TO RELATED APPLICATION(S)

This application claims priority from a U.S. Provisional Application, Ser. No. 60/428,141, entitled "Storable Rake," filed Nov. 21 2002, the contents of which are incorporated herein.

FIELD OF THE INVENTION

The present invention relates generally to tools and implements, and more particularly to rakes and like tools for gathering material or for treating a surface. More particularly, the present invention relates to sand trap rakes for use on golf courses, and to a rake having features that make it compactly and efficiently storable on a golf course or in a bag.

BACKGROUND OF THE INVENTION

Golf courses contain sand traps as a hazard for golfers to avoid. The surface of a sand trap is disturbed by golf balls landing in the sand and by golfers entering the trap to hit balls out. Usually, a garden-type rake is provided near or within the trap for a golfer to smooth over the disturbed surface so subsequent players may also have a smooth sand surface to play on.

Unfortunately, a typical rake lying near or within a sand trap can interfere with normal play. For example, a rolling golf ball may come into contact with the rake thus altering the role trajectory or lie of the ball. Portable rakes have been designed to address this issue. However, these rakes only poorly minimize the profile of the tool, and consequently have little added benefit over the traditional rake. Further, other rakes that do adequately minimize their profile create additional problems because of their design including odor and aesthetic concerns.

A further disadvantage of existing rakes lying near or within a sand trap is the difficulties related to their use, including their retrieval. Because the rake is lying on the ground, it is generally only retrievable by one on foot who must bend over to pick up the rake. Further, a maintenance person or groundskeeper mowing or otherwise conditioning a golf course must frequently move rakes. To do so, it is usually necessary to first stop the mower or other implement, climb off, pick up and move the rake, then climb back on the mower. Many times, a rake will be placed into a sand trap while the area around the trap is being worked on. After the work is completed, the maintenance person again has to leave the equipment to retrieve the rake from the trap. These sequences generate inefficiency for at least two reasons: they use an inordinate amount of time of paid maintenance people, and the equipment (mowers, etc.) is usually left running, contributing to increased fuel consumption and wear and tear.

The golf ball retrieval rakes disclosed in U.S. Pat. No. 5,590,924 (Quinn) and U.S. Pat. No. 5,311,733 (Krenkel) show rakes having tines disposed along frame members attached to the rake handle. These frame members are folded along the handle. The rake in Quinn also includes a telescoping handle. These rakes attempt to minimize profile. However, additional improvements are possible that further decrease the profile of a rake and interfere even less with play.

The retractable rake disclosed in U.S. Pat. No. 4,236,742 (Florence) shows a rake having tines that are storable within the handle of the rake. The operator may actuate a rake control that pulls the tines into the handle. Storing the tines in this way does minimize the profile, nonetheless it is desirable to further minimize profile of the tool.

U.S. Pat. No. 4,854,592 (Milovic) discloses a golf club with an internal sand rake. The tines and frame member may be folded along the rake handle. The tines, frame member, and handle are then storable within the handle and shaft of the golf club. However, it is desirable to provide a rake that does not have to be carried by the golfer and is storable at a sand trap. While the disclosed golf club and internal sand rake may be well-suited for its intended purpose, to store the rake within the golf club may adversely effect a golf swing.

U.S. Pat. No. 3,584,739 (Erichson) discloses a concealed sand trap rake that is stored within a subsurface container on a golf course. The rake is stored within a small container having a lid covered with artificial turf. This design adequately minimizes the profile of the rake to avoid unnecessary interference with play although a golf ball could still strike the lid. Unfortunately, when a course is irrigated and when it rains water fills the container and turns stagnant. The odor is unpleasant and grime builds up on the rake. Golfers often refuse to use such a tool as the odor and grime gets on their hands. It would be advantageous to provide a rake that avoids the odor and grime of the Erichson rake, yet also minimizes interference with golf play.

BRIEF SUMMARY OF THE INVENTION

It is an object of the present invention to provide an implement that can be stored unobtrusively.

Another object of the present invention is to provide implements, including rakes, for use on golf courses, wherein the implements can be made available near sand traps, yet have features that minimize interference with the game.

It is an additional object of this invention to provide a sand trap or bunker rake having a minimized profile to avoid interference with golf play.

It is a further object of this invention to provide a sand rake that addresses odor and aesthetic concerns in a manner superior to that of previously known rakes.

Additionally, it is an object of the present invention increase the efficiency and cost effectiveness of golf course maintenance by providing a rake that can be retrieved and/or moved by someone operating maintenance equipment, such as a mower, without first requiring the operator to dismount from the piece of equipment. That is, because the rake of the present invention is self-supporting in a generally upright vertical position, a maintenance worker can approach the rake, lean over without getting off the equipment, and grab the rake handle and simply move the rake out of the way, for example, to a location behind or to another side of the equipment. This saves time.

The present invention provides a rake having a rake head attached to a rake handle. The rake head carries a plurality of tines. Additionally, the rake presents a spike extending from one end of the rake head. Further, the rake head is pivotally attached to the rake handle. When the rake head is pivoted into a storage position adjacent the rake handle the spike may be placed in the ground to store the rake in a generally vertical storage position.

In one embodiment, the present invention comprises a sand trap or bunker rake for smoothing sand, the rake comprising an extendable, telescoping handle, a rake head pivotally attached to the extendable handle and configured to be movable between a position generally parallel to the handle and a position generally perpendicular to the handle, and a spike attached to an end of the rake head. The rake is adapted to releaseably and selectively secure or lock the rake head in the aforementioned parallel and perpendicular positions.

In another embodiment, the present invention provides a rake having a rake head attached to a rake handle. A plurality of tines are attached to the rake head. Additionally, the rake presents a spike extending from one end of the rake handle. When it is desired to store the rake, the spike may be placed in the ground to store the rake in a generally vertical storage position.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 1 is a plan view of a rake with a telescoping handle (fully collapsed), pivotal rake head, and attached spike that is made according to the present invention.

DETAILED DESCRIPTION

Turning to the drawings, in particular to FIG. 1, a rake 10 is presented having a handle 12. The handle 12 is comprised of at least two telescoping sections (not shown). Each telescoping section has a frusto-conical geometry to complement another telescoping section. In other words, the telescoping sections are constructed so as to movably fit within each other. When the handle 12 is fully extended the telescoping sections snugly seat against one another so as to create a rigid elongated handle 12. Alternatively, the handle 12 can have any known extendable and collapsible structure.

Figure 1A:
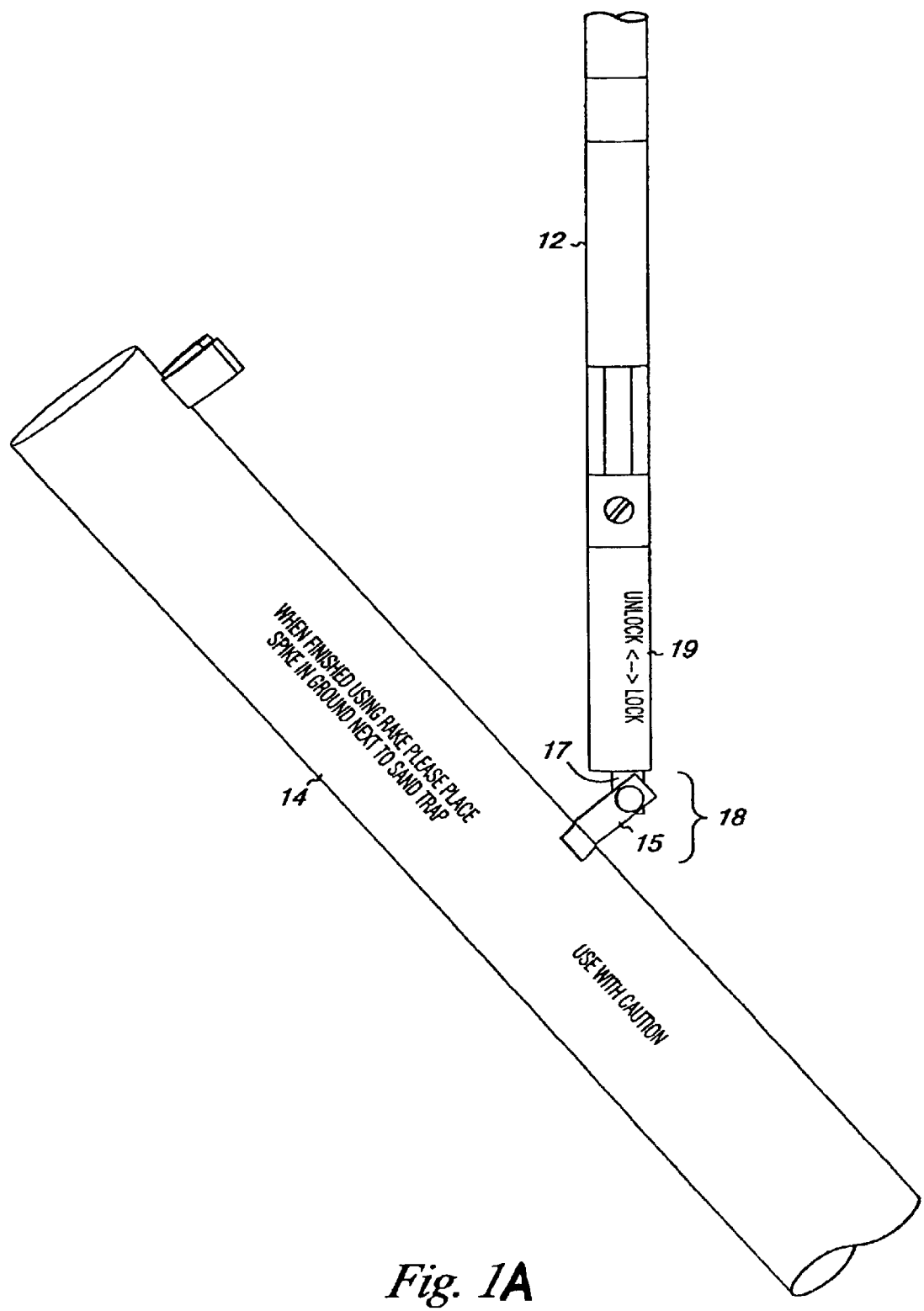
FIG. 1A is a partial perspective view of the rake with the pivot positioned between the working position and the storage position.

Connected to the handle 12 is a rake head 14. The rake head 14 presents a plurality of tines 16 that are parallel to each other and extend perpendicular to the longitudinal axes of the rake handle 12 and rake head 14. In other words, the tines 16 extend from the rake head 14 in a manner commonly understood in the art for rake implements. The rake head 14 is pivotally connected to the rake handle 12 at a pivot 18. As shown in FIG. 1A, this pivot 18 is comprised of a hinge joint, which includes a housing 15 attached to the rake head 14, and a complementary hinge pin 17 attached to the rake handle 12. The hinge pin is retained within the housing to allow pivotal movement of the rake head 14 with respect to the rake handle 12. The pivot 18 is locked into a position in which the handle 12 is perpendicular to the rake head 14 by sliding the sleeve 19 on the handle 12 toward the rake head 14. It is understood that the pivot 18 disclosed herein is not limited to the hinge joint. Any number of pivotal connections could be used including ball joints, flexible materials, universal joints, and other pivotal connections known in the art.

Returning to FIG. 1, a spike 20 is attached to one end of the rake head 14. The spike 20 has a generally cylindrical shape that comes to a point at the spike 20 tip. Alternatively, the spike has any configuration allowing for its insertion into the ground, which may include a blunt, tapered, or conical-shaped tip. The spike 20 extends away from the rake head 14 parallel to the rake head 14 longitudinal axis. The spike 20 is constructed of steel but any hard material capable of retaining the spike shape when used to pierce the ground is suitable. The spike 20 is attached to the rake 14 in a secure fixed fashion by welding. It is understood that the means of attachment for the spike 20 to the rake head 14 are not limited to welding. Instead, it would be suitable to use bolts and nuts, screws, a one piece construction of a spike and rake head, or other functionally equivalent means of connection as are known in the art.

A retaining clip 22 extends from the rake head 14 at a position along one half of the rake head 14 opposite the half of the rake head 14 to which the spike 20 is attached. When in the work position (described below), the retaining clip 22 extends from the rake head 14 in the same direction the rake handle 12 extends away from the rake head 14. Further, the retaining clip 22 extends parallel to the longitudinal axis of rake handle 12. The retaining clip 22 has a generally "U" shaped geometry. The inner surface of the retaining clip 22 has a diameter slightly smaller than the outer diameter of the rake handle 12. The retaining clip 22 is constructed of a resilient material such as low grade steel, aluminum or other suitable material, and maintains its geometry despite being repeatedly forced about the handle 12. Alternatively, the rake head 14 has any known retention or locking mechanism. For example, the mechanism may be a pin and receiving aperture or a detent mechanism. In a further alternative, the retention mechanism is connected to the rake handle 12. It is understood that the materials disclosed in the retaining clip 22 construction are not limiting. It would be suitable to use any material having sufficient resilience for repeated use as a retaining clip with the invention herein described. The retaining clip 22 is attached to the rake head 14 with rivets (not shown). It is understood that the means of attaching the retaining clip 22 to the rake head 14 is not limited to the means disclosed above. Screws, bolts and nuts, welds, and other means of fixedly attaching the retaining clip 22 to the rake head 14 are also suitable.

The rake 10 has both a storage position and working position. As seen in FIG. 1, the working position presents the rake head 14 in a perpendicular orientation to the rake handle 12. The telescoping sections of the handle 12 are fully extended and seated against one another as seen in the alternate embodiment shown in FIG. 3. In the working position, the operator may make use of the rake 10 as is commonly understood to smooth disturbed ground.

Figure 2:
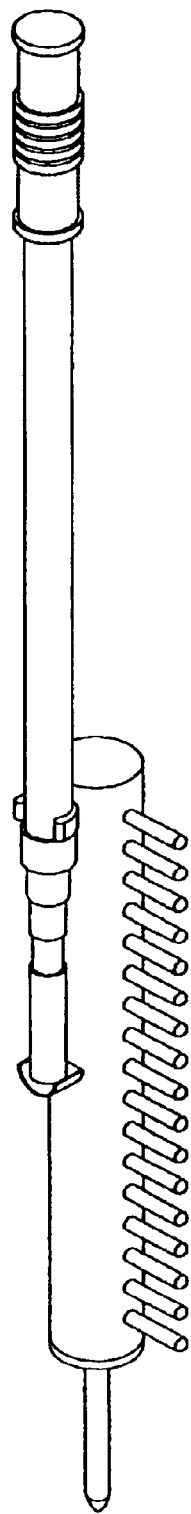
FIG. 2 is a perspective view of the rake with the rake handle fully collapsed, the pivotal rake head retained adjacent the rake handle, and the spike (not shown) retaining the rake in a generally vertical storage position.

When it is desired to store the rake 10 in the storage position the operator collapses the telescoping sections of the handle 12 to substantially shorten the length of the handle 12. The operator then moves the rake head 14 about the pivot 18 so the retaining clip 22 abuts the handle 12. The retaining clip 22 is then forced about the handle 12. The retaining clip 22 momentarily deforms under the applied force from the operator and then snugly seats itself about the handle 12. The rake head 14 is thus retained adjacent to the handle 12. In this position the rake head 14 is now generally parallel to the handle 12. The operator then inserts the spike 20 into the ground by applying force along the handle 12 in the direction of the spike 20. As depicted in FIG. 2, the rake 10 is then in a generally vertical storage position that minimizes interference with golf play. That is to say, the rake 10 is retained in a storage position that substantially reduces the profile of the rake 10 and consequently greatly lessens the chance of obstructing the trajectory of a golf ball in play.

The operator may convert the rake 10 from the storage position to the working position by applying the above steps in reverse. First, the operator removes the rake 10 from its generally vertical storage position by pulling on the handle 12 and removing the spike 20 from the ground. Second, the operator moves the rake head 14 about the pivot 18 so as to position the rake head 14 in a generally perpendicular orientation to the handle 12. Finally, the operator extends the telescoping sections of the handle 12 so they seat against each other, providing a rigid elongated handle 12.

Figure 3:
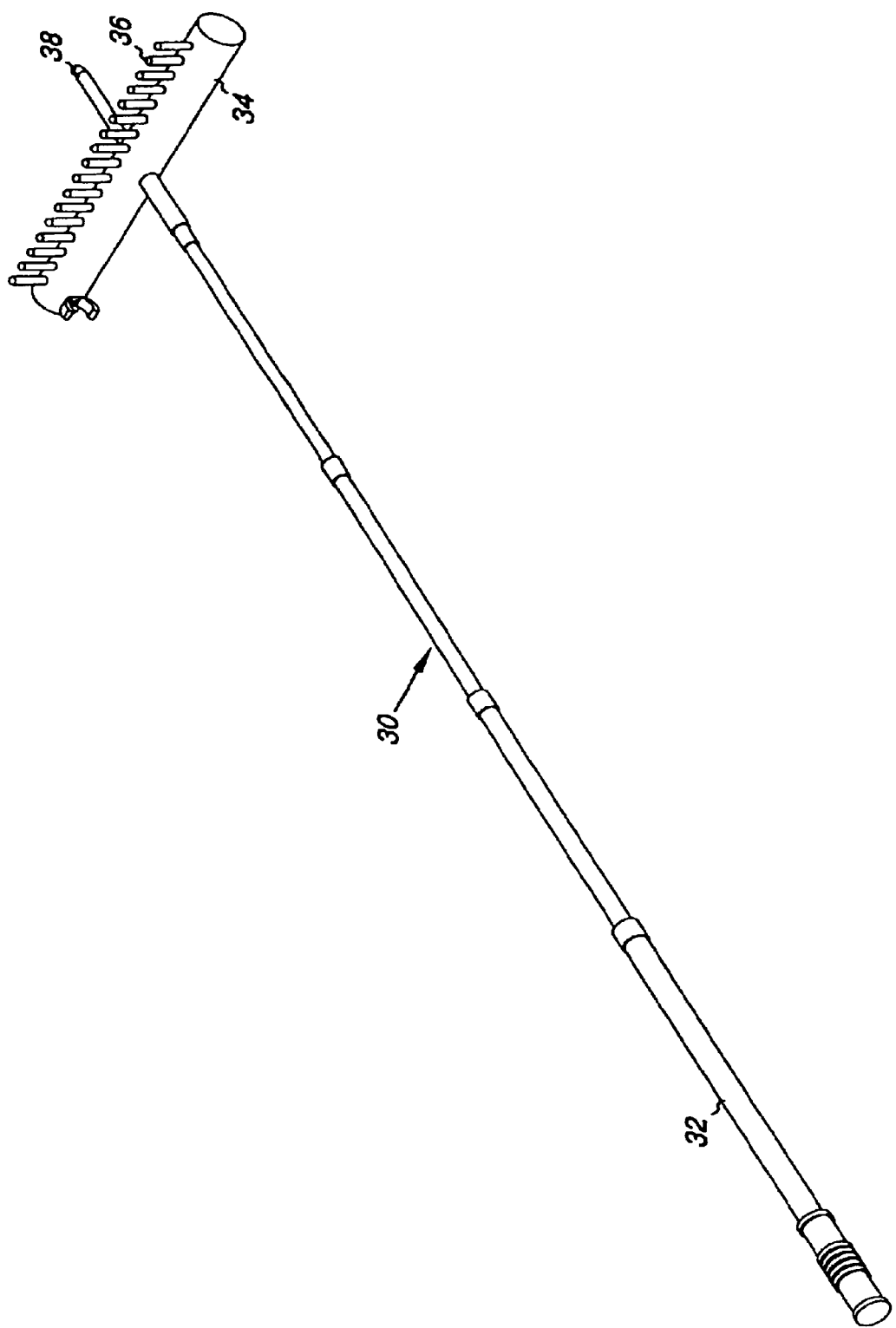
FIG. 3 is a perspective view of an alternative embodiment wherein the rake has an extended telescoping handle and spike attached adjacent to one end of the handle.

A second embodiment is herein disclosed as shown in FIG. 3. A rake 30 is presented having a handle 32. The handle 32 is comprised of at least two telescoping sections. Each telescoping section has a frusto-conical geometry to complement another telescoping section. In other words, the telescoping sections are constructed so as to movably fit within each other. When the handle 32 is fully extended the telescoping sections snugly seat against one another so as to create a rigid elongated handle 32. Alternatively, the handle 32 can have any known extendable and collapsible structure. Connected to the handle 32 is a rake head 34. The rake head 34 presents a plurality of tines 36 that are parallel to each other and extend perpendicular to the longitudinal axes of the rake handle 32 and rake head 34. In other words, the tines 36 extend from the rake head 34 in a manner commonly understood in the art.

A spike 38 is attached to the generally central portion of the rake handle 32. The spike 38 has a generally cylindrical shape that comes to a point at the spike 38 tip. Alternatively, the spike 38 has any configuration allowing for its insertion into the ground. As shown in FIG. 3, when the rake is in a working configuration, i.e., with the rake head generally perpendicular to the handle, the spike 38 is generally axially aligned with and extends away from the rake handle 32. The spike 38 is constructed of steel, but any hard material capable of retaining the spike shape when used to pierce ground is suitable. The spike 38 is attached to the rake 10 in a secure fixed fashion by welding. It is understood that the means of attachment for the spike 38 to the rake handle 32 are not limited to welding. Instead, it would be suitable to use bolts and nuts, screws, a one piece construction of a spike and rake, or other functionally equivalent means of connection as are known in the art. Alternatively, it is understood that a spike could be attached to a rake head and accomplish the same function as the embodiment disclosed above.

The rake 30 has both a storage position and working position. As seen in FIG. 3, the telescoping sections of the handle 32 are fully extended and seated against one another. In the working position, the operator may make use of the rake 30 as is commonly understood to smooth disturbed ground.

Figure 4:
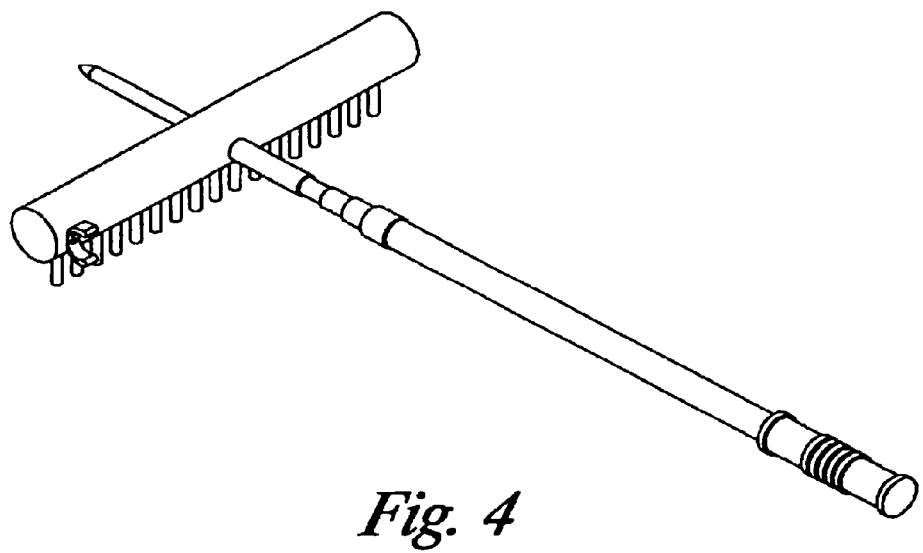
FIG. 4 is a perspective view of the alternative embodiment of FIG. 3 wherein the rake handle is fully collapsed.
Figure 5:
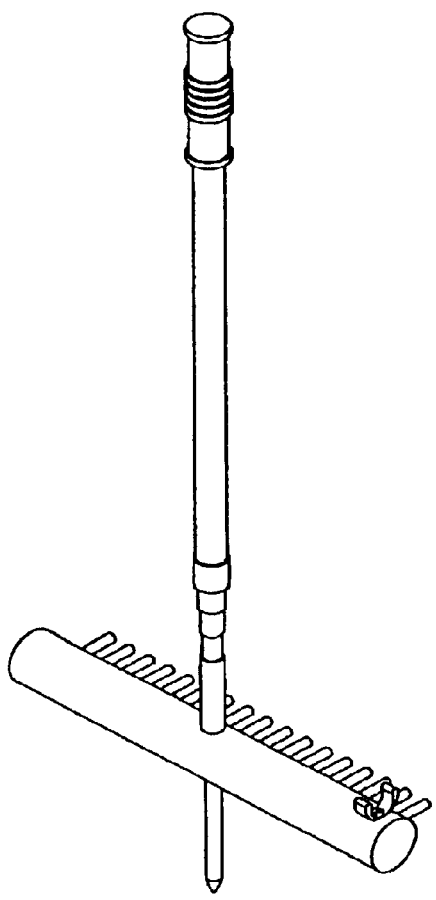
FIG. 5 is a perspective view of the alternative embodiment of FIG. 3 wherein the rake handle is fully collapsed and the spike (not shown) retains the rake in a generally vertical storage position.

When it is desired to store the rake 30 in the storage position the operator collapses the telescoping sections of the handle 32 to substantially shorten the length of the handle 32. This configuration of the handle 32 is shown in FIG. 4. The operator then inserts the spike 38 into the ground by applying force along the handle 32 in the direction of the spike 38. As shown in FIG. 5, the rake 30 is then in a generally vertical storage position that minimizes interference with golf play. That is to say, the rake 30 is retained in a storage position that substantially reduces the profile of the rake 30 and consequently greatly lessens the chance of obstructing the trajectory of a golf ball in play.

The operator may convert the rake 30 from the storage position to the working position by applying the above steps in reverse. The operator removes the rake 30 from its generally vertical storage position by pulling on the handle 32 and removing the spike 38 from the ground. The operator then extends the telescoping sections of the handle 32 so they seat against each other, providing a rigid elongated handle 32.

Figure 6:
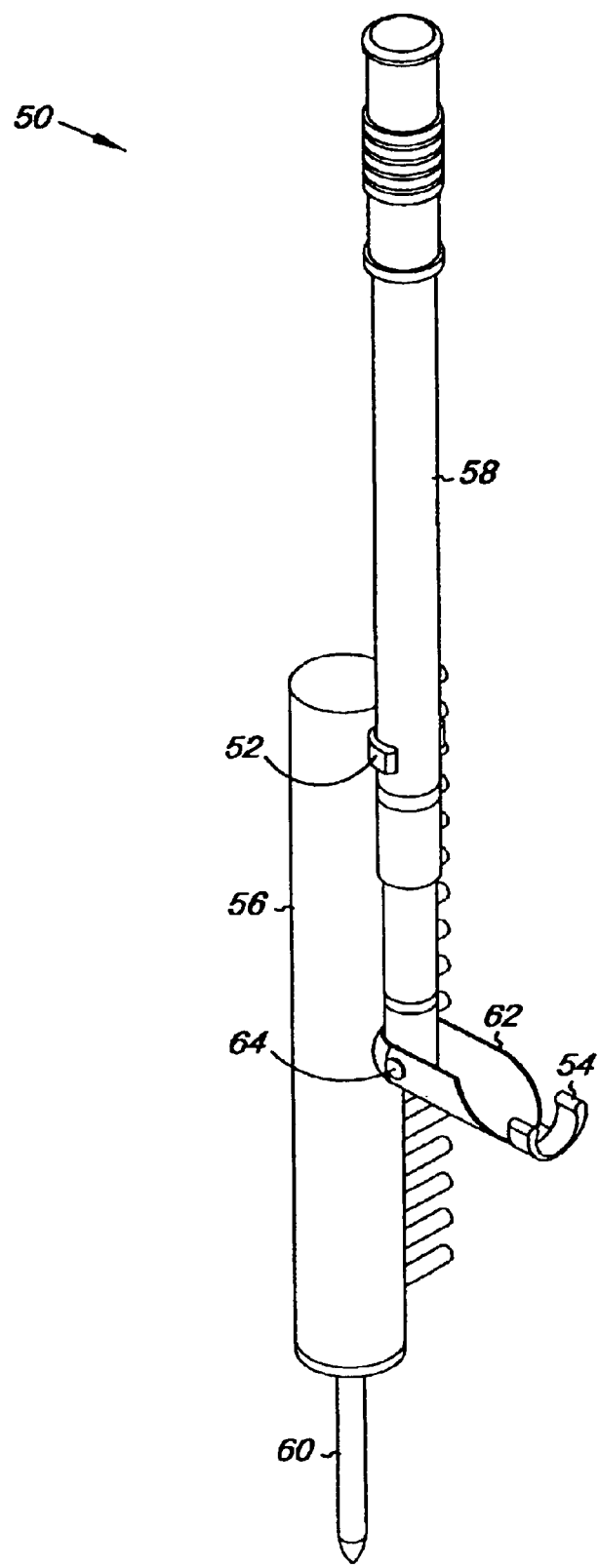
FIG. 6 is a perspective view of a rake in a storage position, according to an alternative embodiment of the present invention.

FIG. 6 depicts a rake 50 according to an alternative embodiment of the present invention. The rake 50 has an extendable handle 58 connected to a rake head 56 by a pivot housing 62. The rake head 56 carries or has an associated spike 60 and a first retaining clip 52. The pivot housing 62 carries a second retaining clip 54 and a pivot pin 64 that extends through an end portion of the handle 58.

According to one embodiment, the extendable handle 58 is similar to the rake handles 12, 32 disclosed herein. According to a further aspect of the invention, the rake head 56 is similar to rake heads 14, 34 disclosed herein. The spike 60, in accordance with one embodiment, is similar to spike 20 disclosed herein.

Figure 6A:
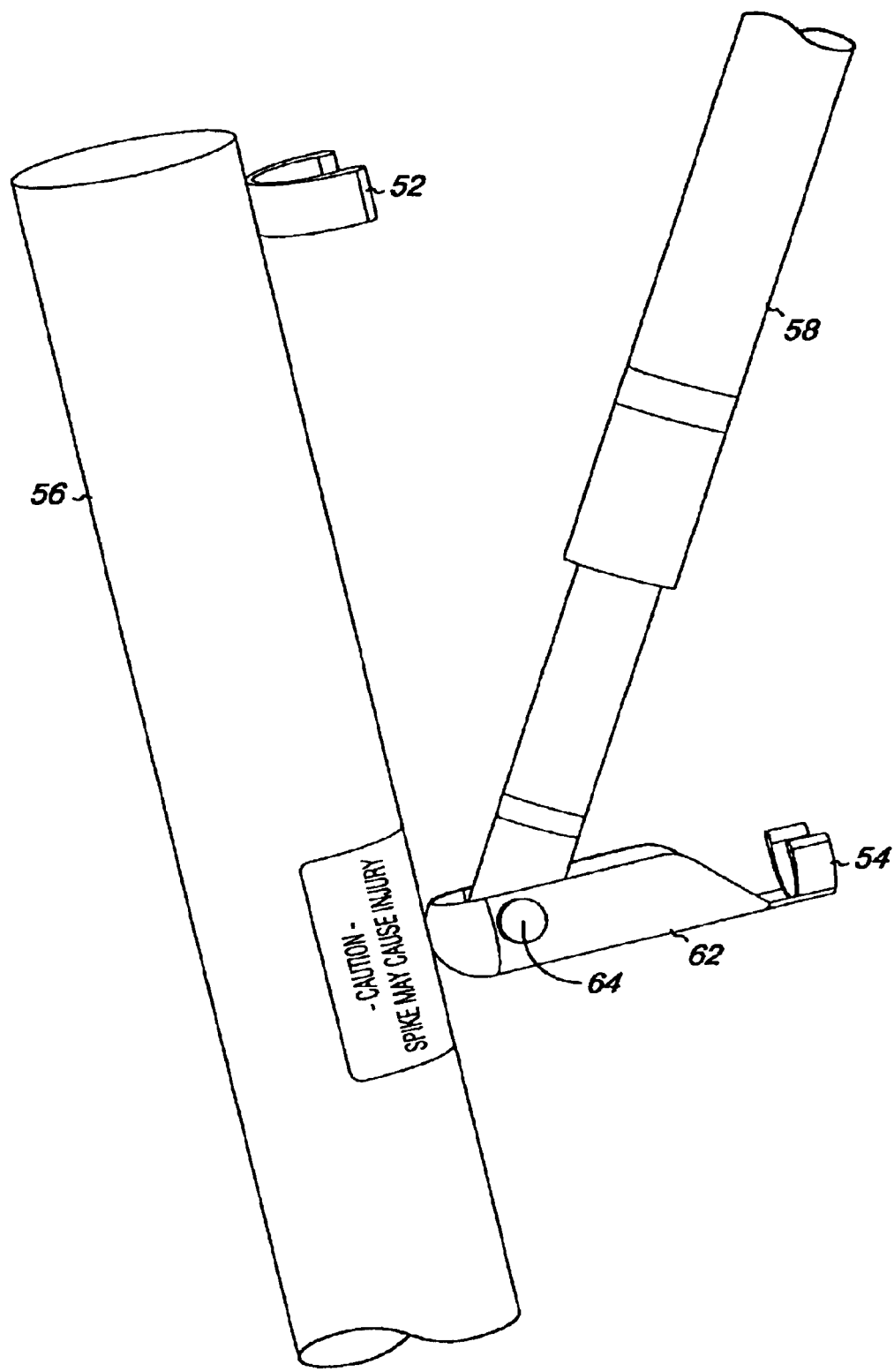
FIG. 6A is a partial perspective view of a rake in a position between the working position and the storage position, according to an alternative embodiment of the present invention.

The first retaining clip 52 extends from the rake head 56 at a position along one half of the rake head 56 opposite of the half of the rake head 56 to which the spike 60 is attached. According to one aspect of the present invention, the first retaining clip 52 is similar to the retaining clip 22 herein. The second retaining clip 54 extends from the pivot housing 62 attached to the rake head 56. In one embodiment, the pivot housing 62 extends from a midpoint of the rake head 56. As shown in FIG. 6A, the pivot pin 64 on the pivot housing 62 allows the handle 58 to move between a working position and a storage position. The second retaining clip 54 extends from the pivot housing 62 toward the first retaining clip 52 and, according to one aspect of the invention, is similar in configuration to the first retaining clip 52. Alternatively, the rake head 56 and the pivot housing 62 have any known retention mechanisms. For example, the mechanisms may be a pin and receiving aperture or a detent. In further alternative embodiments, the retention mechanisms could be connected to the rake handle 12 to receive the rake head.

Figure 7:
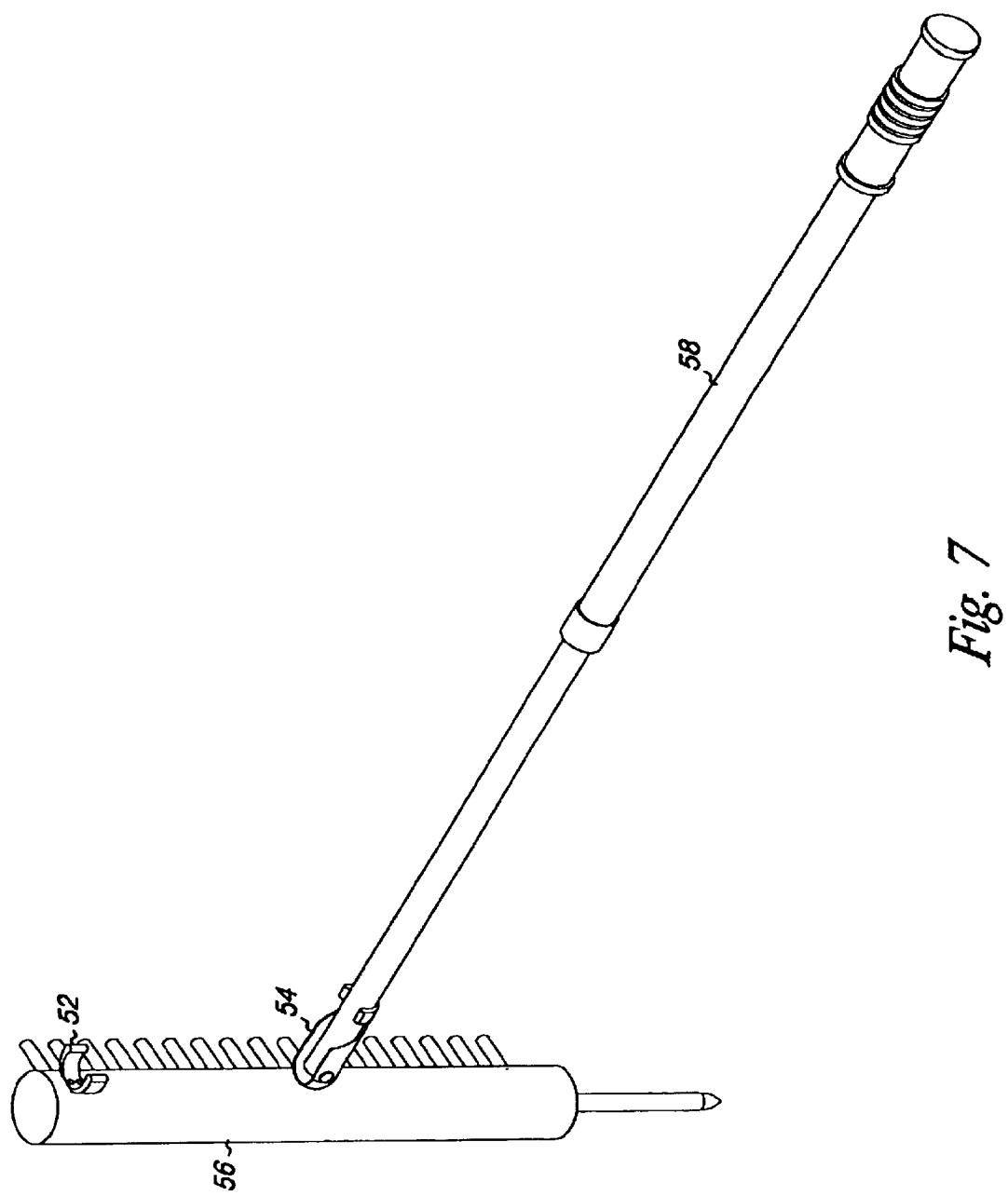
FIG. 7 is a perspective view of a rake in a working position, according to an alternative embodiment of the present invention.

In operation, the two retaining clips 52, 54 allow the handle 58 to be firmly positioned in either the storage position or the working position. The rake 50 as depicted in FIG. 6 is in the storage position and the handle 58 is in its collapsed configuration, with the telescoping sections of the handle 58 collapsed to result in a short handle 58. The handle 58 according to one embodiment can be moved from a storage position to a working position in the following manner. In the storage position as shown in FIG. 6, the handle 58 is retained in a position parallel to the rake head 56 by the first retaining clip 52, which is attached to the handle 58. To move the handle 58 to the working position, the handle 58 is pulled from the first retaining clip 52 and moved about the pivot 64 toward a position perpendicular to the rake head 56. As the handle 58 reaches the working position, the handle 58 is then forced into the second retaining clip 54. Further, the handle 58 at some point is moved into its extended position, wherein the telescoping sections of the handle 58 are extended so that they seat against each other. The rake 50 as depicted in FIG. 7 is in the working position. When moving the handle 58 from the working position to the storage position, the above steps can be performed in reverse order.

It is understood that the handles disclosed herein may be comprised of two or more telescoping sections. Additionally, it is understood that the handles described herein may have a one piece construction as is commonly understood in the art.

Although certain embodiments of the present invention, including preferred embodiments, have been described herein, persons skilled in the art will recognize that changes may be made in form and detail without departing from the spirit and scope of the invention.

What is claimed is:

1. A rake comprising:
   an extendable handle;
   a rake head pivotally attached to said handle, wherein the rake head carries a plurality of tines and is pivotally movable between a position generally parallel to the handle and a position generally perpendicular to the handle without being detached from the handle; and
   a spike coupled to the rake, wherein said spike is generally perpendicular to said plurality of tines.

2. The rake according to claim 1, wherein the spike is attached to the rake head.

3. The rake according to claim 1, wherein the spike is attached to the handle.

4. The rake according to claim 1, wherein the handle is comprised of at least two sections with complementary cross sections whereby one section fits within the other.

5. The rake according to claim 1, wherein the rake head is retained in the position parallel to the handle by a first retaining mechanism coupled to the rake head.

6. The rake according to claim 1, wherein the rake head is retained in the position perpendicular to the handle by a second retaining mechanism coupled to the rake head.

7. A sand trap rake for smoothing sand in sand traps, the rake comprising:
   an extendable handle;
   a rake head pivotally attached to the extendable handle, the rake head carrying a plurality of tines and configured to be movable between a position generally parallel to the handle and a position generally perpendicular to the handle without being detached from the handle; and
   a spike attached to an end of the rake head, wherein said spike is generally perpendicular to said plurality of tines.

8. The rake according to claim 7, further comprising a pivot housing generally between the rake head and the handle, wherein the pivot housing is fixedly attached to the rake head, the handle being movably attached to the pivot housing.

9. The rake according to claim 8, further comprising a first means for retaining carried by the pivot housing for retaining the handle when the rake head and handle are relatively generally perpendicular.

10. The rake according to claim 9, further comprising a second means for retaining carried by the rake head for retaining the handle when the rake head and handle are relatively generally parallel.

11. The rake according to claim 10, wherein said first and second means for retaining comprise generally C-shaped retaining clips.

12. The rake according to claim 11, wherein the rake head has two ends and said second means for retaining is generally adjacent to the end opposite to the end to which the spike is attached.

13. The rake according to claim 11, wherein the relatively perpendicular position of the rake head and handle is a working position, and wherein the relatively parallel position is a storage position in which the rake is adapted to be placed and remain in a generally upright position adjacent to a sand trap.

14. A rake comprising:
   an extendable handle comprising at least two telescoping handle members;
   a rake head pivotally attached to said handle at one end of one of said telescoping handle members, wherein the rake head carries a plurality of tines and is pivotally moveable between a position generally parallel to the handle and a position generally perpendicular to the handle without being detached from the handle; and
   a spike coupled to the rake, wherein said spike is generally perpendicular to said plurality of tines.

15. The rake according to claim 14, further comprising means for locking the rake head in the generally perpendicular position.

16. The rake according to claim 15, wherein said means for locking comprises a generally tubular locking member slidably carried on the handle generally at the end of the handle to which the rake head is attached, said locking member slidable between a position in which the rake head is free to pivot relative to the handle and the generally perpendicular position.

17. The rake according to claim 16, further comprising means for retaining the rake head in the generally parallel position.

18. The rake according to claim 17, wherein the relatively perpendicular position of the rake head and handle is a working position, and wherein the relatively parallel position is a storage position in which the rake is adapted to be placed and remain in a generally vertical position adjacent to a sand trap.

* * * * *